United States Patent
Muegge

(10) Patent No.: US 10,414,333 B2
(45) Date of Patent: Sep. 17, 2019

(54) AUXILIARY STOP LAMP FOR VEHICLES

(71) Applicant: Hella KGaA Hueck & Co., Lippstadt (DE)

(72) Inventor: Martin Muegge, Geseke (DE)

(73) Assignee: Hella KGaA Hueck & Co., Lippstadt (DE)

( * ) Notice: Subject to any disclaimer, the term of this patent is extended or adjusted under 35 U.S.C. 154(b) by 8 days.

(21) Appl. No.: 15/613,452

(22) Filed: Jun. 5, 2017

(65) Prior Publication Data

US 2017/0267164 A1 Sep. 21, 2017

Related U.S. Application Data

(63) Continuation of application No. PCT/EP2015/078661, filed on Dec. 4, 2015.

(30) Foreign Application Priority Data

Dec. 4, 2014 (DE) .......................... 10 2014 117 842

(51) Int. Cl.
*B60Q 1/30* (2006.01)
*F21S 43/13* (2018.01)
(Continued)

(52) U.S. Cl.
CPC .............. *B60Q 1/302* (2013.01); *B60Q 1/44* (2013.01); *F21S 43/13* (2018.01); *F21S 43/14* (2018.01);
(Continued)

(58) Field of Classification Search
CPC . B60Q 1/30; B60Q 1/302; B60Q 1/44; B60Q 1/442; B60Q 1/444; B60Q 1/445;
(Continued)

(56) References Cited

U.S. PATENT DOCUMENTS 4,733,335 A 3/1988 Serizawa et al.
5,101,193 A 3/1992 Smith et al.
(Continued)

FOREIGN PATENT DOCUMENTS

DE 44 11 440 A1 10/1994
DE 44 21 306 A1 1/1995
(Continued)

OTHER PUBLICATIONS

International Search Report dated Feb. 17, 2016 (English Translation).

*Primary Examiner* — Stephone B Allen
*Assistant Examiner* — Adam W Booher
(74) *Attorney, Agent, or Firm* — Muncy, Geissler, Olds & Lowe, P.C.

(57) ABSTRACT

An auxiliary stop lamp for vehicles, in particular a high mounted stop lamp for vehicles, having a light source for the radiation of a light beam and having a holographic element for the refraction and/or reflection of the light beam, the holographic element having a holographic light distributor to generate a stop light function, wherein the holographic element is arranged inside and/or in the region of an edge of a housing of the auxiliary stop lamp, or embodied as an edge of the housing of the auxiliary stop lamp.

14 Claims, 4 Drawing Sheets

(51) Int. Cl.
*F21S 43/20* (2018.01)
*F21S 43/40* (2018.01)
*F21S 43/14* (2018.01)
*B60Q 1/44* (2006.01)
*F21V 5/00* (2018.01)
*G03H 1/22* (2006.01)
*G03H 1/26* (2006.01)

(52) U.S. Cl.
CPC ............... *F21S 43/26* (2018.01); *F21S 43/40* (2018.01); *F21V 5/002* (2013.01); *B60Q 1/30* (2013.01); *G03H 1/2202* (2013.01); *G03H 2001/2228* (2013.01); *G03H 2001/2615* (2013.01)

(58) Field of Classification Search
CPC . B60Q 1/447; F21S 43/10; F21S 43/13; F21S 43/14; F21S 43/20; F21S 43/26; F21S 43/30; F21S 43/40; F21V 5/002; F21V 5/003; F21V 5/10; G03H 2001/2223; G03H 2001/2228; G03H 2001/2231; G03H 2001/2234; G03H 2001/2605; G03H 2001/261; G03H 2001/2615; G03H 1/22; G03H 1/2202; G03H 1/26; F21L 15/02
See application file for complete search history.

(56) References Cited

U.S. PATENT DOCUMENTS

| | | |
|---|---|---|
| 5,347,435 A | 9/1994 | Smith et al. |
| 5,455,747 A | 10/1995 | Aoyama |
| 5,571,277 A | 11/1996 | Allred et al. |
| 5,708,519 A | 1/1998 | Yamamoto et al. |
| 5,731,060 A * | 3/1998 | Hirukawa ............ G03H 1/0256 428/142 |
| 5,774,241 A | 6/1998 | Smith |
| 2008/0068852 A1* | 3/2008 | Goihl ..................... F21V 5/002 362/509 |
| 2010/0253919 A1* | 10/2010 | Douglas ................. G03B 21/14 353/13 |

FOREIGN PATENT DOCUMENTS

| | | |
|---|---|---|
| DE | 693 11704 T2 | 10/1997 |
| DE | 1981 2793 A1 | 10/1998 |
| DE | 10 2011 012 520 A1 | 8/2012 |
| EP | 0 870 655 A1 | 10/1998 |
| JP | H079913 A | 1/1995 |

* cited by examiner

AUXILIARY STOP LAMP FOR VEHICLES

This nonprovisional application is a continuation of International Application No. PCT/EP2015/078661, which was filed on Dec. 4, 2015, and which claims priority to German Patent Application No. 10 2014 117 842.4, which was filed in Germany on Dec. 4, 2014, and which are both herein incorporated by reference.

BACKGROUND OF THE INVENTION

Field of the Invention

The present invention relates to an auxiliary stop lamp for vehicles, in particular to a high mounted stop lamp (CHMSL) for vehicles, having a light source for the radiation of a light beam and a holographic element for the diffraction and/or reflection of the light beam, the holographic element having a holographic light distributor to generate a stop light function.

Description of the Background Art

From U.S. Pat. No. 5,347,435 an auxiliary stop lamp for vehicles is known, which is arranged in a hollow between an interior headliner and a roof of a vehicle. A light source and a reflector are arranged in a die-cast metal housing being positioned in said hollow. A holographic element for the diffraction of the light beam is arranged on a rear window arranged in front of the light source in the direction of radiation, so that the given auxiliary stop light function can be generated. The disadvantage of the known auxiliary stop lamp is its complex design comprising different optical components including a separation of the light-generating components and the uncoupled positioning of the holographic element on the rear window.

From DE 10 2011 012 520 A1, an auxiliary stop lamp for vehicles is known, which has a light source and optical elements being arranged on the headliner of the vehicle on the one hand and a holographic element for the diffraction and/or reflection of the light beam emitted by the light source being arranged on the inside of a rear window on the other hand. The holographic element has a holographic light distributor for the generation of a stop light function. The disadvantage of this auxiliary stop lamp is that relatively large positional tolerances occur during the positioning of the light source and the optical elements on the one hand and the holographic element on the other hand, which are all spaced apart. The holographic element in particular requires relatively precise positioning on the rear window, thus excluding the danger that part of the light beam emitted by the light source passes the holographic element by.

SUMMARY OF THE INVENTION

It is therefore an object of the present invention to further develop an auxiliary stop lamp for vehicles comprising a light source and a holographic element in a manner, that ensures, on the one hand, a simple assembly and a compact light unit and, on the other hand, a high optical efficiency without restricted view or limitation of the field of view by a rear window of a vehicle.

In an exemplary embodiment, a holographic element is arranged inside and/or in a region of the edge of a housing of the auxiliary stop lamp or is embodied as an edge of the housing of the auxiliary stop lamp. The auxiliary stop lamp can have, for example, a partially transparent housing.

According to an exemplary embodiment of the invention a holographic element is part of the auxiliary stop lamp, as it is arranged inside and/or in the region of the edge of a housing or as it is embodied as an edge of the same housing or arranged in the region of the light aperture. Advantageously, a definite position of the holographic element relative to the light source, respectively to further optical elements is ensured. The holographic element is spacially adjusted relative to the light source so that a relatively high optical efficiency is given. Occurring tolerances with regard to the position of the rear lamp in front have no effect on the degree of efficiency. The invention allows a simple and compact design of the auxiliary stop lamp.

According to an embodiment of the invention, the holographic element can be arranged on an inside or outside of a lens of the housing forming the edge, respectively the light aperture of the auxiliary stop lamp. An edge region of the holographic element and/or of the lens is fastened on an edge of the housing. Due to the fact that the holographic element is directly connected to the housing of the auxiliary stop lamp via the lens, a defined spatial assignment of the holographic element relative to the light source is achieved.

According to an embodiment of the invention, a longitudinal wall of the housing running at an acute angle toward or running parallel to the holographic element is embodied in an at least partially transparent manner, so that the driver's view out of the rear window is always unobstructed. Preferably, the part of the housing which is arranged recessed in the headliner is not transparent and a further part of the housing, which protrudes from the headliner of the vehicle, is embodied in a transparent manner. This ensures the largest degree of free sight for the driver.

According to an embodiment of the invention, the light source is arranged in the housing on a narrow side of the housing opposite the holographic element. In the vicinity of the light source, an additional optical element is arranged, which has the shape of a Fresnel element or a lens element for the bundling and deflection of the light toward the holographic element. Advantageously, a better optical degree of efficiency of the auxiliary stop lamp can be achieved by this means and/or the auxiliary stop lamp can be embodied in an advantageously small manner, particularly with regard to height.

According to an embodiment of the invention, the light source is arranged in the region of a longitudinal wall of the housing, so that the light radiated by the light source is radiated at substantially right angles relative to the longitudinal wall. The auxiliary stop lamp has a deflecting reflector, by means of which the light beam radiated by the light source is deflected in the direction of the holographic element. By this means, a reflector with a metallized surface can be used to guide the light toward the holographic element.

According to an embodiment of the invention, the holographic element is arranged on an additional optic lens running at substantially right angles between the juxtaposed longitudinal sides of the housing. The optic lens carrying the holographic element can be embodied in an advantageously small manner. Advantageously, a relatively large lens, which would have to touch the rear window of the vehicle, is not necessary.

According to an embodiment of the invention, the holographic element can be arranged on an inside of the transparent longitudinal side of the housing. Here, the holographic element can be embodied, for example, as a volume reflection holographic element. Advantageously, the lens of the housing can herein be dispensed with.

According to an embodiment of the invention, the auxiliary stop lamp can be arranged in a region of a headliner or in a region of a parcel shelf of the vehicle. In both locations, the auxiliary stop lamp can be positioned in a relatively compact and space-saving manner.

According to an embodiment of the invention, the holographic element can be, for example, a film into which a structure diffracting the light according to the given lighting function is integrated. Due to miniaturization, the structure is imperceptible to the human eye, so that the holographic element is perceived as transparent, respectively invisible by the observer.

According to an embodiment of the invention, the holographic element can be, for example, a film having a surface hologram. Here, a surface structure of the foil causes the diffraction of the light.

According to an embodiment, the holographic element can also be realized as, for example, a diffractive optical element can be introduced directly into the injection-molding tool as a surface structure and can be molded directly onto the lens during injection molding.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
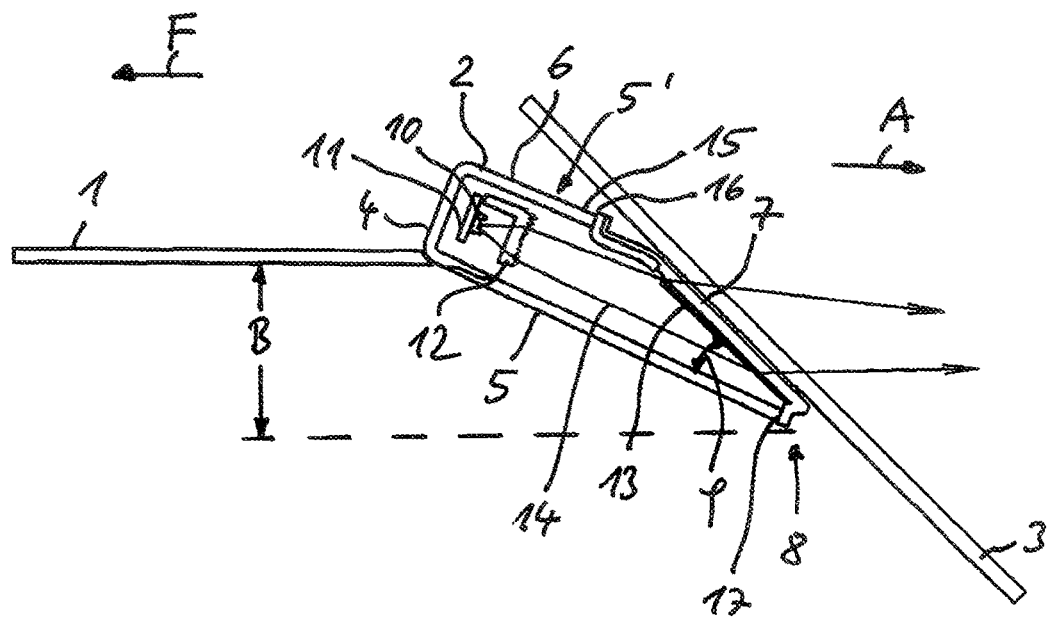
FIG. 1 shows a lateral view of an auxiliary stop lamp integrated in a headliner according to an embodiment.

According to an embodiment of an auxiliary stop lamp for vehicles according to FIG. 1, the auxiliary stop lamp for vehicles is arranged in a rear region of a headliner 1 of a vehicle as a central high mounted stop lamp (CHMSL). The auxiliary stop lamp has a housing 2 being fastened in the usual manner between a wall of the headliner 1 and a rear window 3 of the vehicle. The housing 2 is embodied stretched in the transverse direction relative to the vehicle. It has a narrow side 4 running in the transverse direction relative to the vehicle and longitudinal sides 5, 5' running at substantially right angles to the former and being situated opposite each other. The upper longitudinal side 5' is embodied in a segmented manner. A first segment 6 joining the narrow side 4 preferably at a right angle is integrally formed onto the narrow side 4 and has an opaque or lightproof material. A second segment 7 of the upper longitudinal side 5' joining against the direction of travel F of the vehicle joins the segment 6 under an acute angle and meets the lower longitudinal side 5 essentially under an acute angle $\varphi$.

The second segment 7 is embodied as a lens, which is embodied in a transparent (light-transmissive, clear) manner. The lower longitudinal side 5, can be connected in an integrally formed manner onto the narrow side 4, for example by means of two-component injection-molding, and can also be transparent so that a region B between the headliner 1 and a tip 8 of the housing 2 pointing downward in an oblique manner allows the driver an unobstructed view out of the rear window 3. The lens 7 has full contact with the surface of an inside of the rear window 3. The housing 2 therefore has a non-transparent housing part being essentially arranged above the headliner 1, and a transparent part being arranged below the headliner 1.

A light source 10 having a row of LED-light sources is arranged inside the housing within the region of the narrow side 4. The row of LED light sources 10 is arranged on a strip-shaped printed circuit board 11 running in a direction of an extension of the narrow side 4 and are attached to the same. An optical element 12 is arranged in front of the LED light sources 10 in the direction of radiation A to collect the light 14 radiated by the LED light sources 10 in the direction of the lens 7. A holographic element 13 having a holographic light distributor to generate a stop light function is applied on an inside of the lens 7. The holographic element 13 is arranged in the region of a light aperture of the auxiliary stop lamp. The holographic element 13 has a structure on which a light beam 14 radiated by the light source 10 is diffracted in a manner that the given stop light function is generated. Light distribution information determining a spatial distribution with horizontal and vertical measuring points and light intensities is stored in the holographic element 13.

The holographic element 13 can be, for example, a holographic-optical element (HOE) which can belong to the class of diffractive optical elements. In comparison with conventional refractive optical elements, diffractive optical elements offer significantly smaller optical structures diffracting the light in a limited spectral range. The diffractive optical elements may be, for example embodied as a grid, a lens, or mirror beam splitters or combinations hereof.

The holographic element 13 can be, for example, a volume holographic element, which in the embodiment according to FIG. 1 is a volume transmission holographic element. The volume holographic element is embodied as an emulsion or as a holographic film. For example, the holographic element is embodied as a photopolymer in the form of a film. The volume holographic element can be embodied as a relatively thick hologram, as its lattice constant g is always smaller than a thickness d of the film material. The product resulting from the thickness d of the hologram and the wavelength λ used is considerably larger than the square of the lattice constant g, see:

$$\lambda \times d \gg g^2$$

As the lattice constant g is relatively small, in the range of the wavelengths λ of the light 14 at most, the lattice structure is almost invisible to the human eye. Therefore, the holographic element 13 appears transparent.

The holographic element 13 embodied as a film can be, for example, preformed by means of deep-drawing, can be inserted in an injection-molding tool and can be coated with a material of the lens 9 by means of injection-molding. Alternatively, the holographic element film 13 can also be glued or welded onto the lens 7 afterwards, for example by means of ultrasonic welding.

The light beam 14 is diffracted on the holographic element 13 under a defined, limited angle and spectral range. Due to this, the light-directing structures (lattice structure) applied to the holographic recording medium are almost invisible to the observer. Advantageously, the holographic element 13 is embodied as a transparent component having no visible optical structures.

According to an embodiment of the invention, the holographic element 13 provided as a diffractive optical element can also be inserted directly in an injection-molding tool and be inserted in the lens 9 by means of injection-molding. Depending on the size of the diffractive structure, the optical area may have a diffuse, milky appearance.

The resulting holographic surface element is characterized by a relatively large diffusivity, thus impairing the transparency of the holographic element 13.

According to an embodiment of the invention, the holographic element 13 can also be applied on an outside of the lenses 7 instead of on an inside of the same.

According to an embodiment of the invention, the optical element 12 can be embodied as a Fresnel optics element. Alternatively, the optical element 12 can also be embodied as an aspherical optical element or as a different type of lens collecting the light and guiding it in the direction of the holographic element 13. The holographic element 13 itself allows a deflection of the light beam 14 and distribution of the same according to the desired light function. The holographic element 13 according to the embodiment of the invention according to FIG. 1 is situated inside an edge 15 of the housing 2 formed by the lens 7. This holographic element 13 is situated in the region of the edge 15 of the housing 2, just like a holographic element applied to the outside of the lens 9. The holographic element 13 extends, for example, over the entire surface of the lens 7 to an edge 16 of the first segment 6 of the upper longitudinal side 5' and to an edge 17 of the lower longitudinal side 5. The lens 7 is connected with the first segment 6, respectively with the lower longitudinal side 5 of the housing 2 by gluing or by welding.

According to an embodiment of the invention, the second segment 7 running an angle can also be embodied exclusively by the holographic element 13. Due to this, the lens 7 can be omitted.

Figure 2:
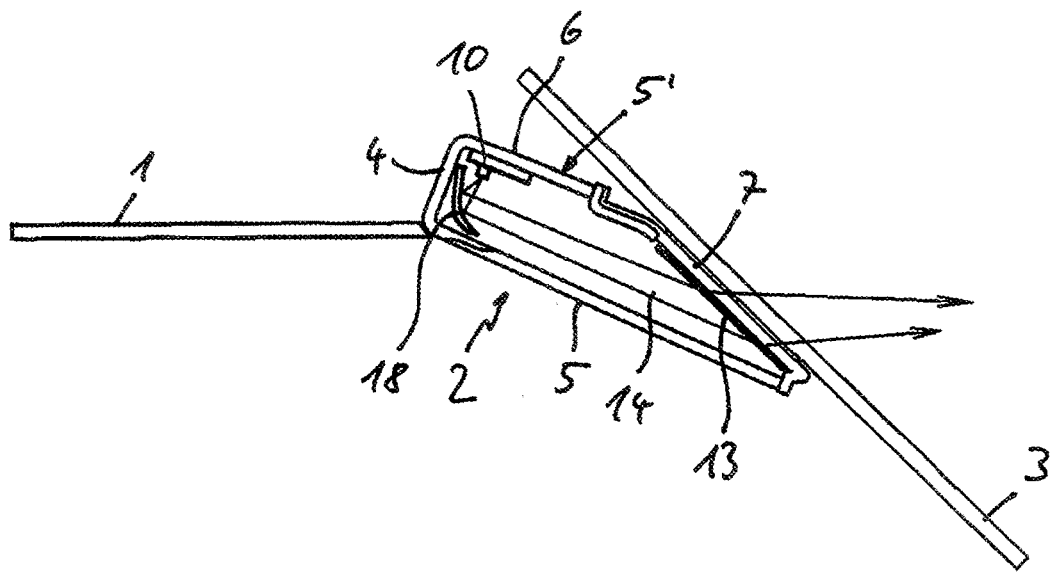
FIG. 2 shows an auxiliary stop lamp integrated in a headliner according to an embodiment.

According to an embodiment of the invention according to FIG. 2, the light source 10 is arranged on the upper longitudinal side 5', namely on the first segment 6 of the same, wherein it radiates the light beam 14 at substantially right angles to the opposite lower longitudinal side 5.

A deflecting reflector 18 deflecting the light beam 14 radiated by the light source 10 in the direction of the holographic element 13, for example, substantially parallel to the lower longitudinal wall or the longitudinal side 5, is arranged in the region of the narrow side 4. The deflecting reflector 18 has a metalized surface which forms a reflector surface.

Figure 3:
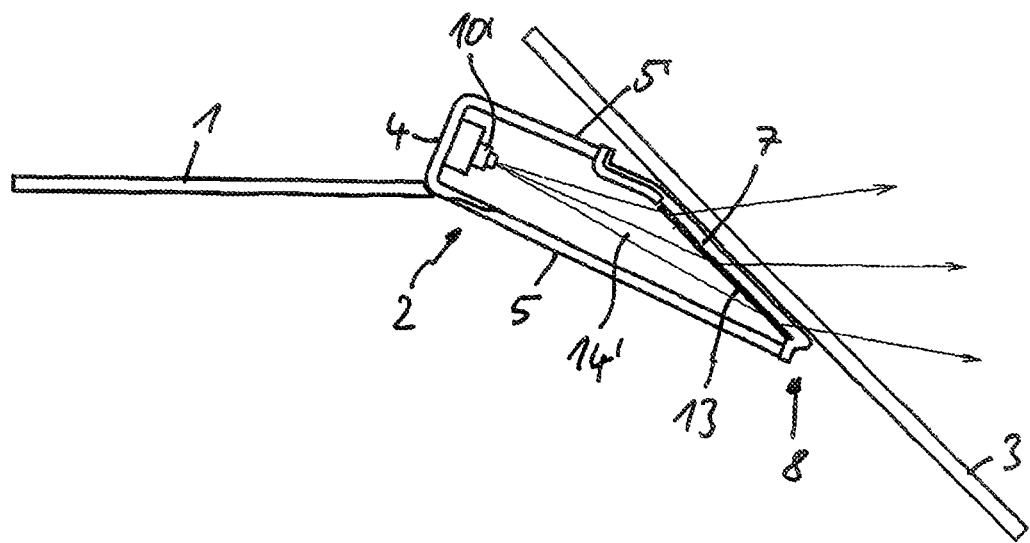
FIG. 3 shows an auxiliary stop lamp integrated in a headliner according to an embodiment.

According to an embodiment of the invention according to FIG. 3, the light source can be embodied as a number of laser light sources 10' arranged in a row, wherein the light beam 14' radiated by the laser light sources 10' is radiated directly, without further optical elements, in the direction of the holographic element 13.

Figure 4:
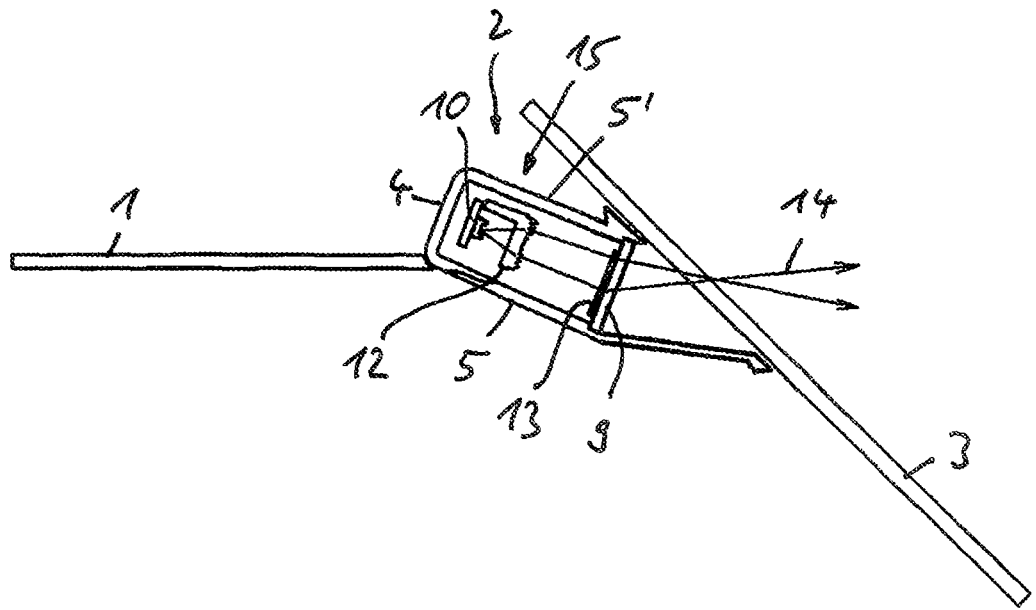
FIG. 4 shows an auxiliary stop lamp integrated in a headliner according to an embodiment.

According to an embodiment of the invention according to FIG. 4, a lens 9 carrying the holographic element 13 is embodied as an additional lens running at substantially right angles between the opposing longitudinal sides 5, 5' and being fastened to them. The additional lens 9' is arranged at a distance to the rear window 3.

Figure 5:
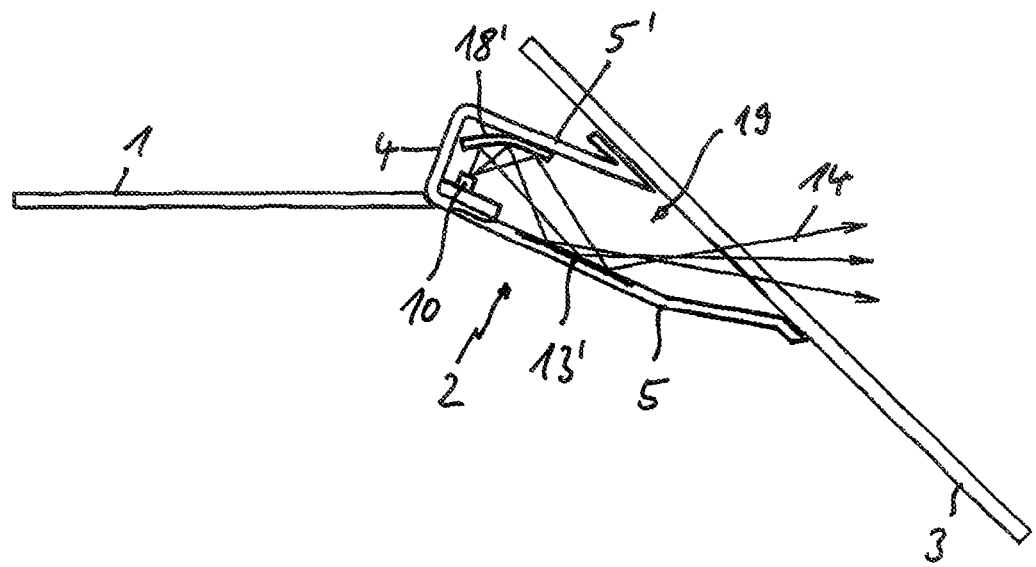
FIG. 5 shows an auxiliary stop lamp integrated in a headliner according to an embodiment.

According to a further embodiment of the invention according to FIG. 5, the holographic element is embodied as a volume reflection holographic element 13' being arranged on an inside of the transparent longitudinal side 5. The light source 10 is arranged on the same longitudinal side 5 and radiates the light beam 14 onto the deflecting reflector 18' on the opposite side, from where the light beam 14 is deflected in the direction of the volume reflection holographic element 13'. From the volume reflection holographic element 13', the light beam 14 is then deflected outwards and through the rear window 3 through an opening 19 in the housing 2. The deflecting reflector 18' has a metalized surface for the reflection of the light beam 14.

In the above exemplary embodiments of the invention, the auxiliary stop lamp can always be arranged in a region of a headliner (roof element) of a vehicle.

Figure 6:
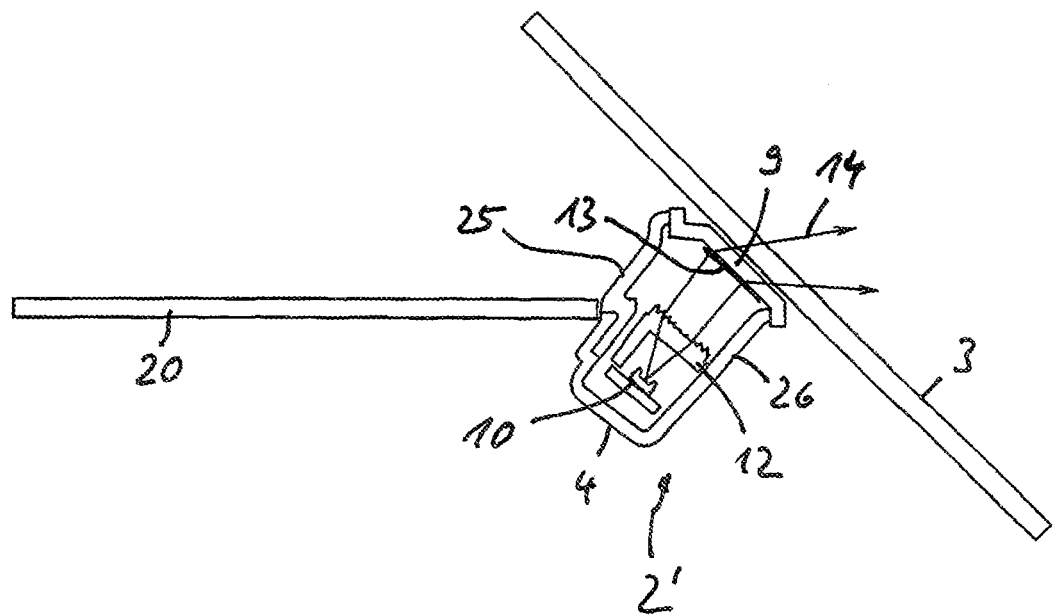
FIG. 6 shows an auxiliary stop lamp integrated in a parcel shelf according to an embodiment.

According to an embodiment of the invention according to FIG. 6, the auxiliary stop lamp is arranged in the region of a parcel shelf 20 of the vehicle. The embodiment of the auxiliary stop lamp in FIG. 6 corresponds essentially to the embodiment according to FIG. 4, the longitudinal housing 2' comprising the light source 10, a Fresnel optical element 12 being situated in front of it, and a lens 9 carrying the holographic element 13. The housing 2' is oriented relative to the parcel shelf 20 so that the lens 9 runs parallel to the rear window 3. The lens 9 and an upper longitudinal side 25 of the housing 2' are embodied in a transparent manner, so that there is no restricted view for the vehicle occupants. A lower longitudinal side 26 and the narrow side 4 of the housing 2' are made from a non-transparent material, for example an opaque material, and are connected to the upper longitudinal side 25 respectively the lens 9 by means of gluing or welding.

Figure 7:
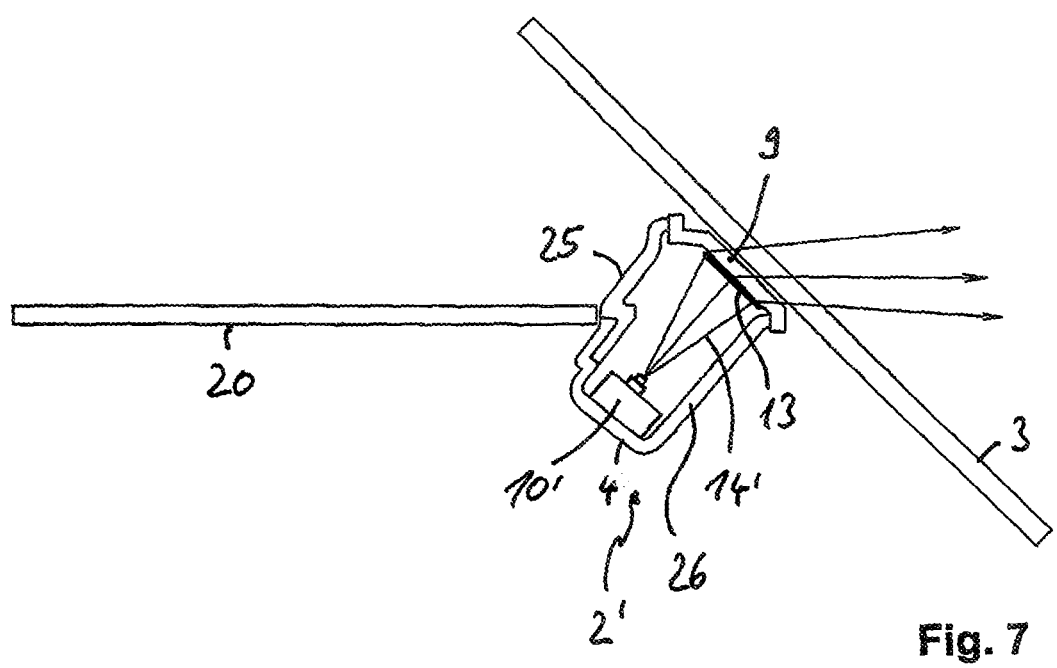
FIG. 7 shows an auxiliary stop lamp integrated in a parcel shelf according to an embodiment.

According to an embodiment of the invention according to FIG. 7, a light source 10' having laser light sources from which the light beam 14' is directly directed to the lens 9, can also be provided in the housing 2'. The light beam 14' is diffracted, respectively distributed according to the stop light function on the holographic element 13 which is preferably arranged on the inside of the lens 9.

The housing 2' is embodied in a manner that at least the part of the housing situated above the parcel shelf 20 is made from a transparent material, so that the view is not restricted.

It is understood that the characteristics mentioned above can be used on their own or any number of them can be used in any conceivable combination. The described embodiments are not to be understood as an exhaustive list, but they have, instead exemplary character for the description of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An auxiliary stop lamp for a vehicle, the auxiliary stop lamp comprising:
   a light source for radiation of a light beam; and
   a holographic element for a diffraction or reflection of the light beam, the holographic element having a holographic light distributor to generate a stop light function, wherein the holographic element is a transmission or a reflection holographic element and is arranged inside or in a region of an edge of a housing of the auxiliary stop lamp or as an edge of the housing of the auxiliary stop lamp or in a region of a light aperture of the auxiliary stop lamp, wherein the holographic element is applied on an inner surface of a lens, so that the holographic element is positioned between the light source and the lens, and such that the light beam emitted by the light source is first diffracted or reflected by the holographic element before being transmitted to the lens, and wherein the lens and a side of the housing located below a headliner or a side of the housing located above a parcel shelf of the vehicle are transparent.

2. The auxiliary stop lamp according to claim 1, wherein the lens forms the edge of the auxiliary stop lamp.

3. The auxiliary stop lamp according to claim 1, wherein the light source is arranged in the housing on a narrow side of the housing opposite the holographic element such that the light beam emitted by the light source is guided essentially parallel in a direction of the holographic element via an optical element assigned to the light source.

4. The auxiliary stop lamp according to claim 1, wherein the light source is arranged on a longitudinal side of the housing, and wherein a deflecting reflector is assigned to the light source for a deflection of the light beam radiated from the light source in a direction substantially parallel to the longitudinal side of the housing.

5. The auxiliary stop lamp according to claim 1, wherein the light source is a laser light source arranged on a narrow side of the housing opposite the holographic element.

6. The auxiliary stop lamp according to claim 1, wherein the lens is located between opposing longitudinal sides of the housing.

7. The auxiliary stop lamp according to claim 1, wherein the auxiliary stop lamp is arranged in the region of the headliner or in the region of the parcel shelf of the vehicle.

8. The auxiliary stop lamp according to claim 1, wherein the holographic element is a film in which a structure diffracting light according to a given light function is integrated or applied.

9. The auxiliary stop lamp according to claim 1, wherein the holographic element is configured such that a homogenous, regularly illuminated light radiating surface with a desired light distribution pattern is generated and/or that any defined, illumination pattern is generated and/or that a pattern partially deviating from the planar illumination or symbol or graphics is generated and/or that an illuminated graphics creating a three-dimensional impression with a depth effect is generated.

10. The auxiliary stop lamp according to claim 1, wherein the auxiliary stop lamp is a high mounted stop lamp.

11. The auxiliary stop lamp according to claim 1, further comprising an optical element or reflector that guides the light beam emitted from the light source in a direction of the holographic element.

12. The auxiliary stop lamp according to claim 1, wherein the lens extends in a plane that is parallel to a window of the vehicle to which the auxiliary stop lamp is mounted.

13. An auxiliary stop lamp for a vehicle, the auxiliary stop lamp comprising:
a light source for radiation of a light beam; and
a holographic element for a reflection of the light beam, the holographic element having a holographic light distributor to generate a stop light function,
wherein the holographic element is a reflection holographic element and is arranged inside a housing of the auxiliary stop lamp,
wherein the holographic element is applied on an inner surface of a longitudinal side of the housing as a volume reflection holographic element, the longitudinal side of the housing being transparent, and
wherein the auxiliary stop lamp does not include a lens, such that the light beam that is diffracted or reflected by the holographic element is transmitted directly to a window of the vehicle to which the auxiliary stop lamp is mounted.

14. An auxiliary stop lamp for a vehicle, the auxiliary stop lamp comprising:
a light source for radiation of a light beam; and
a holographic element for a diffraction or reflection of the light beam, the holographic element having a holographic light distributor to generate a stop light function,
wherein the holographic element is a transmission or a reflection holographic element and is arranged inside or in a region of an edge of a housing of the auxiliary stop lamp or as an edge of the housing of the auxiliary stop lamp or in a region of a light aperture of the auxiliary stop lamp,
wherein the holographic element is applied on an inner surface of a lens, so that the holographic element is positioned between the light source and the lens, and such that the light beam emitted by the light source is first diffracted or reflected by the holographic element before being transmitted to the lens, and
wherein the holographic element is a diffractive optical element on the lens, which is applied to an injection-molding tool and which is formed during injection-molding of the lens.

* * * * *